United States Patent

Marshall et al.

[11] Patent Number: 5,941,145
[45] Date of Patent: Aug. 24, 1999

[54] TUBE SQUARING TOOL

[75] Inventors: Mark A. Marshall, El Dorado Hills; Marty E. Pound, Elk Grove, both of Calif.

[73] Assignee: TRI Tool Inc., Rancho Cordova, Calif.

[21] Appl. No.: 08/970,198

[22] Filed: Nov. 14, 1997

[51] Int. Cl.⁶ .................................................. B23B 5/08
[52] U.S. Cl. .............................. 82/113; 82/128; 82/130; 82/131; 279/123
[58] Field of Search .............................. 82/113, 1.2, 128, 82/130, 131; 408/104, 105, 106, 107, 137; 279/123, 151, 152, 153, 137

[56] References Cited

U.S. PATENT DOCUMENTS

| | | |
|---|---|---|
| D. 383,960 | 9/1997 | Sandford et al. . |
| 2,737,225 | 3/1956 | Jasinski ................................ 408/104 X |
| 3,228,268 | 1/1966 | Strout . |
| 3,875,831 | 4/1975 | Beauloye . |
| 3,938,411 | 2/1976 | Jonelis et al. . |
| 4,319,503 | 3/1982 | Saine et al. . |
| 4,365,528 | 12/1982 | Astle . |
| 4,486,129 | 12/1984 | Vowel . |
| 4,655,108 | 4/1987 | Galos . |
| 4,739,682 | 4/1988 | Birkestrand . |
| 4,772,034 | 9/1988 | Brown .................................. 279/123 X |
| 5,054,342 | 10/1991 | Swiatowy et al. ..................... 82/128 X |
| 5,605,084 | 2/1997 | Pierce . |
| 5,671,646 | 9/1997 | Sandford et al. . |
| 5,743,539 | 4/1998 | VanderPol et al. ..................... 82/113 X |

*Primary Examiner*—Andrea L. Pitts
*Assistant Examiner*—Henry W. H. Tsai
*Attorney, Agent, or Firm*—Bacon & Thomas, PLLC

[57] ABSTRACT

A tube squaring tool includes a housing having forward and rearward end areas and a tubular workpiece clamping device located at the forward end area for securing and retaining a tubular workpiece relative to the housing so that the end of the workpiece can be machined by a rotary cutting head carried by the housing and movable towards and away from the end of the workpiece by manipulation of a feed mechanism. The tubular workpiece clamping device includes a pair of saddle members carried within a saddle mounting ring with one of the saddle members being frictionally secured within the mounting ring using a detent mechanism and the other saddle member being movable relative to the mounting ring and the opposing saddle member by a threaded connector that enables clamping of a tubular workpiece between the saddle members when the moveable saddle member is moved in a clamping direction towards the opposed fixed saddle member. Interchangeability of the saddle members to accommodate different size workpieces is facilitated by the friction coupling between one of the saddle members and the mounting ring and the saddle members are configured so that they may be readily removed and replaced through a radial retaining projection located on the forward end of the mounting ring.

7 Claims, 4 Drawing Sheets

TUBE SQUARING TOOL

BACKGROUND OF THE INVENTION

1. Field of the Invention

This invention relates to a portable tube squaring tool for enabling cutting of the ends of tubular workpieces to form square, bevel, undercut and other desired profiles on the ends of the workpieces.

2. Discussion of Related Art

Portable tube squaring tools are conventionally designed to rapidly secure a tubular workpiece relative to a cutting head carrying cutter bits so that the end of a tubular workpiece can be machined into an appropriate configuration quickly and efficiently in a repetitive manner. Repeatedly machining the ends of large numbers of different size tubular workpieces requires that the tool have a quick clamping and releasing arrangement for securing the workpieces to the tool and also requires that the workpiece holding device be adjustable to accommodate different diameter tubular workpieces.

A tube squaring tool constructed in accordance with the prior art is illustrated in U.S. Pat. No. 5,671,646 granted Sep. 30, 1997, as well as U.S. Pat. No. 4,739,682 granted Apr. 26, 1988. Still another example of a tube squaring tool is shown in U.S. Pat. No. 5,605,084 granted Feb. 25, 1997.

In tube squaring tools, the workpiece clamping device must be capable of repeatedly clamping tubular workpieces so that they are centered on the cutting axis of the tool which corresponds with the rotation axis of the tool cutting head. Also, exchanging the clamping devices to accommodate various size tubular workpieces must be carried out rapidly and efficiently. In accordance with the prior art, in particular, apparatus such as described in U.S. Pat. No. 5,671,646, the workpiece camping device utilizes a pair of saddle members that are each generally semi-circular in configuration and include arcuate inner surfaces that can be advanced towards each other to effectively clamp a tubular workpiece between the saddle members. Selective motion of one saddle member relative to the other saddle member to clamp a workpiece is achieved by a threaded actuator member that, when rotated, moves one saddle member relative to the other saddle member towards and away from the cutting axis of the tool.

In accordance with this prior art example, one of the saddle members is typically moved selectively by the clamping actuator, while the other saddle member is fixed in a mounting ring by another threaded member or members during operation of the tool. Replacing the saddle members involves disconnecting a plurality of threaded devices which are labor intensive and utilizes valuable time to effect changing of the saddle members.

It is highly desirable to facilitate the rapid changing of saddle members on a tube squaring tool that eliminates the need for special tools or disconnecting threaded members and the like while still providing a robust structure capable of securing tubular workpieces rigidly to the tube squaring tool during a machining operation.

BRIEF SUMMARY OF THE INVENTION

In accordance with the present invention, a tube squaring tool is provided that includes a housing having a tube clamping device located at the forward end of the housing, the clamping device including an annular saddle mounting ring rigidly connected to the housing and a pair of saddle members mounted within the mounting ring annulus. The saddle members have curved inner surfaces that engage a tubular workpiece and are movable towards and away from each other by an appropriate actuating member that enables clamping of a tubular workpiece between the saddle members. The mounting ring includes a radially extending projection that restrains the saddle members against forward motion.

The saddle members are secured to the mounting ring in a simple manner whereby the saddle members may be removed from the mounting ring by moving them radially inwardly and out through the forward ends of the mounting ring with a minimum of manipulation of securing elements holding the saddle members within the mounting ring.

More specifically, upper and lower saddle members are mounted within the mounting ring and restrained therein against rotational motion around the longitudinal cutting axis of the tool and against axial motion forwardly and rearwardly relative to the mounting ring. A moveable one of the saddle members is connected to a threaded connector that enables advancement of the saddle member towards and away from the other saddle member by simple rotation of a clamping handle, while the opposed saddle member is restrained in the mounting ring by a friction detent that is readily releasable by a release lever carried by the housing and mounting ring assembly.

Manipulation of the release lever disengages the opposed saddle member from the mounting ring by pivotal movement of the lever which dislodges the lower saddle member from the detent. The opposed saddle member can then be quickly raised and removed through the front end of the mounting ring. The moveable saddle member may then be released from the threaded connector and likewise separated from the mounting ring by moving it inwardly and forwardly. Replacement of the saddle members is the reverse of their removal and is carried out quickly and efficiently by simply placing the lower saddle member into the mounting ring and lowering it against the annulus of the mounting ring so that it is frictionally engaged by the detent member and held in such position until it is released. The upper saddle member is then inserted into the mounting ring above the lower saddle member and connected to the threaded connector so that it may be moved radially within the mounting ring in the manner previously described.

The structure and function of the various elements constituting the preferred embodiment of the invention will be apparent from the following detailed description and with reference to the appended drawings.

DETAILED DESCRIPTION OF PREFERRED EMBODIMENT(S)

Figure 1:
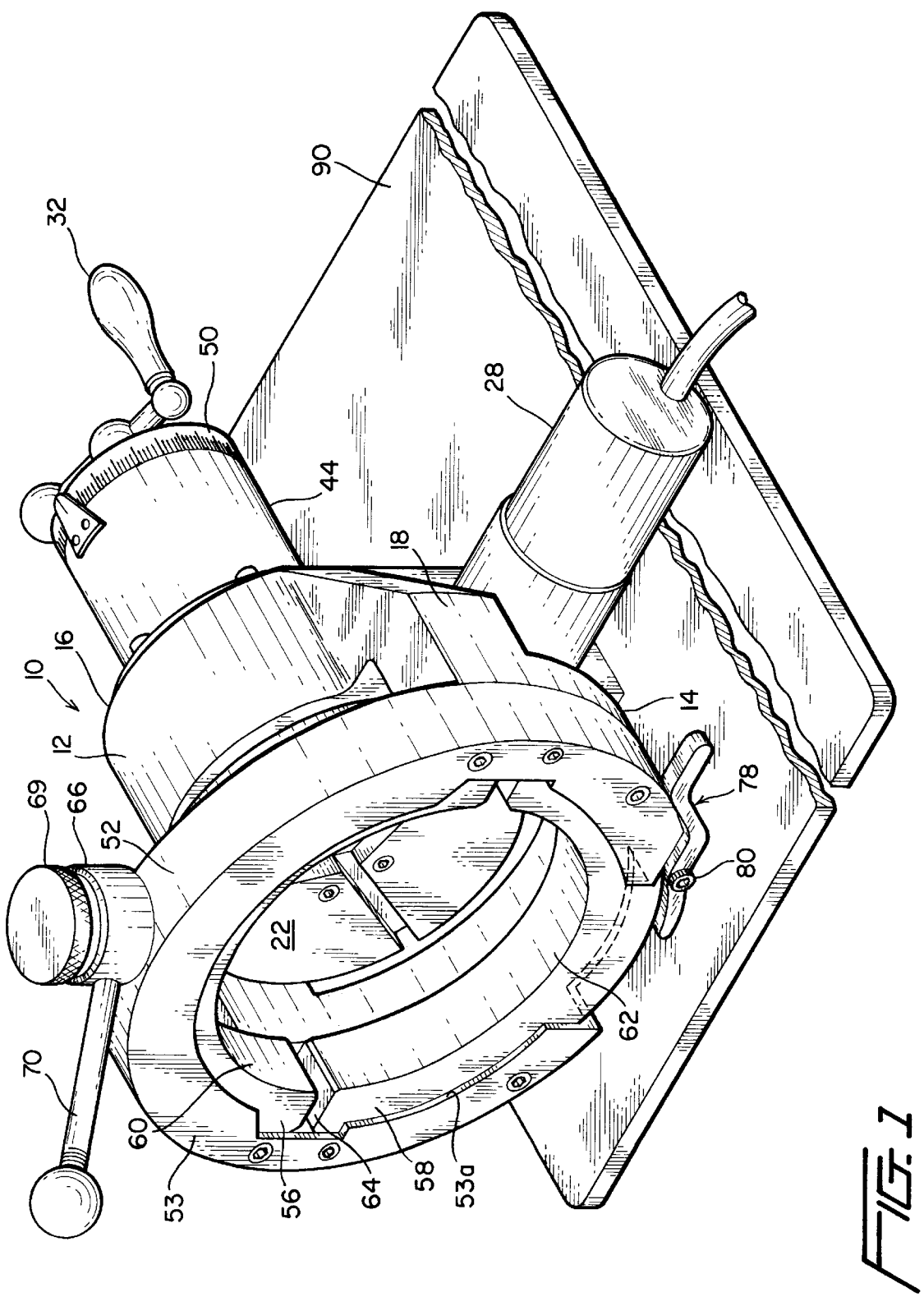
FIG. 1 is an upper perspective view showing the tube squaring tool embodying the invention for which protection is sought.

With reference to the appended drawings, a tube squaring tool 10 embodying the invention for which protection is sought includes a housing 12 that includes a forward end area 14 and a rearward end area 16 spaced longitudinally apart along the length of the tool 10. The housing 12, the forward end area 14 and the rearward end area 16 are integrally connected as a single piece in accordance with the preferred form of the invention. For example, the forward end area 14 may be connected to the main body 12 of the housing by forwardly extending circumferentially spaced arms 18 that are formed as a single piece with the main body of the housing 12 and which support at their forward ends the forward end area 14 of the housing that preferably is in the form of a partially circular element. As noted previously, the forward end area 14, the arms 18, the main housing 12 and the rearward end area 16, in accordance with the preferred form of the invention, are formed as a single, one-piece structure.

Figure 3:
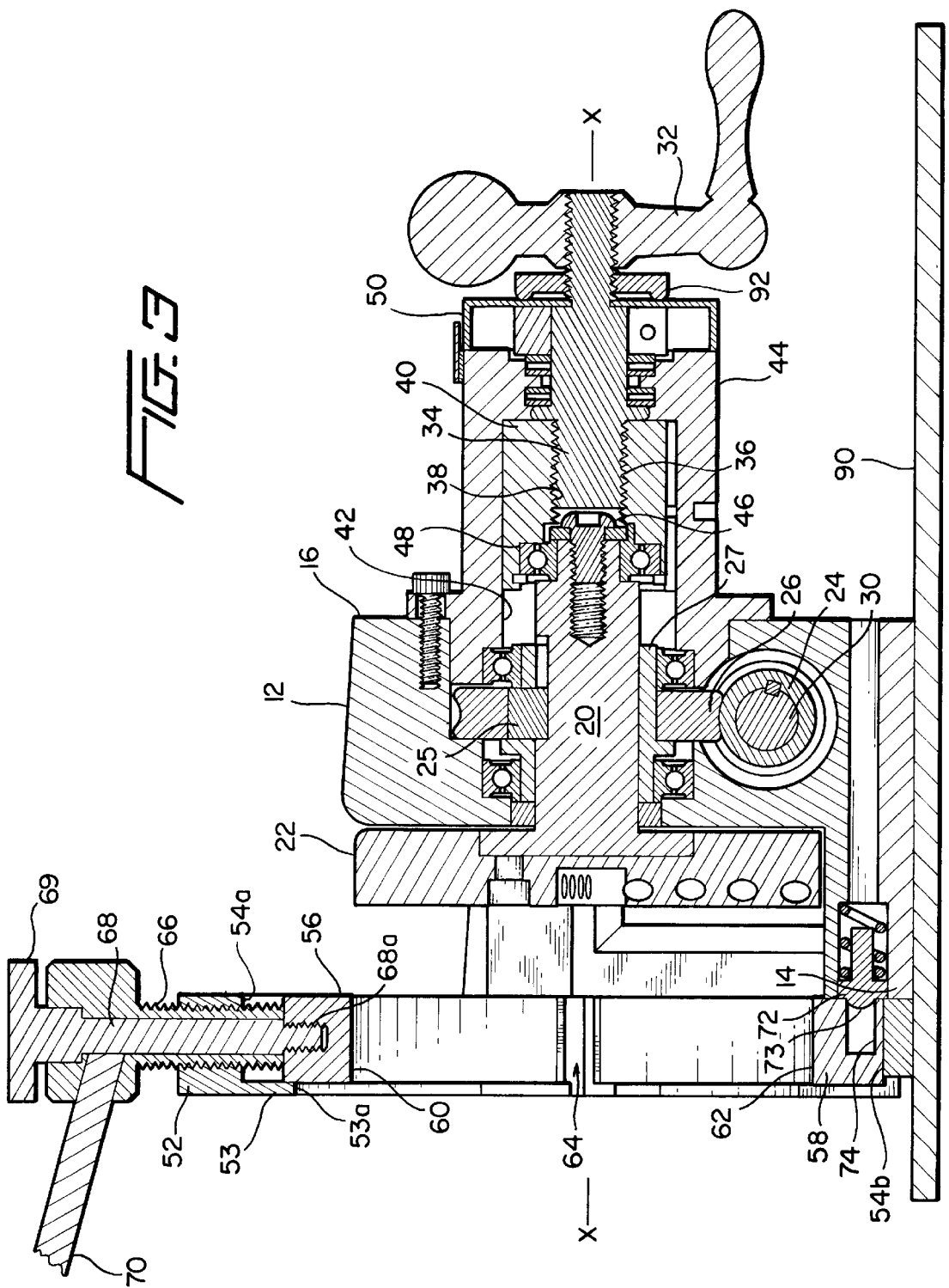
FIG. 3 is a vertical section view taken substantially along the central axis of the tube squaring tool illustrated in FIGS. 1 and 2 taken along line III—III in FIG. 4.

As shown in FIG. 3, a spindle 20 is rotatably mounted in housing 12 for rotation about a cutting axis extending along line X—X. A cutting head 22 is mounted at the forward end of the spindle 20 by suitable fasteners and is arranged to receive cutter bits 23 on its forward facing side that may be advanced towards the end of a tubular workpiece clamped to the forward end area of the tool in a manner to be described below in order to carry out a cutting operation on the end area of the tubular work piece. An appropriate rotary motion transmitting device such as a worm gear set 24, 26 is connected to the spindle 20 to transmit rotary motion of the gear set to the spindle 20 to cause its rotation about cutting axis X—X when actuated by an appropriate motor 28 arranged to rotate a drive shaft 30 connected to the gear set 24, 26. Appropriate bearings are provided to support the spindle 20 for rotary motion and to enable its displacement axially relative to the housing 12 and the gearset 24, 26. For example, a key-in-slot connection 25 and bushing 27 may be used to enable longitudinal motion of spindle 20 and head 22 in housing 12 relative to the gearset 24, 26, while it rotates in the housing.

The spindle 20 and the cutting head 22 connected thereto are movable axially along the cutting axis X—X by a feed handle or crank 32 connected to a feed shaft 34 having external threads 36 connected to internal threads 38 of a feed nut 40 that is axially slidable in a bore 42 in a feed housing 44 bolted to the rear end area 16 of housing 12. The feed nut 40 moves axially along the cutting axis X—X upon rotation of the feed shaft 34 which is axially fixed relative to the feed housing 44 by appropriate thrust bearings.

The cutting head 22, spindle 20 and feed nut 40 are illustrated in FIG. 3 at a rearward extreme position whereat the feed nut 40 is bottomed against an end wall of the bore 42.

The feed nut 40 is connected to the spindle 20 by an appropriate fastener 46 that is axially threaded into the rearward end of the spindle 20 to retain the feed nut 40 in engagement with the spindle 20 through a feed nut bearing 48 that permits rotation of the spindle 20 relative to the feed nut 40 while maintaining the feed nut 40 in engagement with the spindle 20 for axial translation of the spindle 20 and the cutting head 22 along cutting axis X—X.

An adjustable indicator scale 50 may be provided on the feed shaft 34 to permit visual indicia of the axial feed motion of the cutting head 22 when feed handle 32 is actuated in a rotational direction around the cutting axis X—X.

It is to be understood that the feed mechanism illustrated and described above is a preferred form of the invention and it is to be understood that other feed devices, including a cam feed such as shown in U.S. Pat. No. 5,671,646 assigned to the Assignee of the present invention also could be utilized as a feed mechanism. Other feed mechanisms could be utilized interchangeably with the preferred embodiment illustrated.

Figure 2:
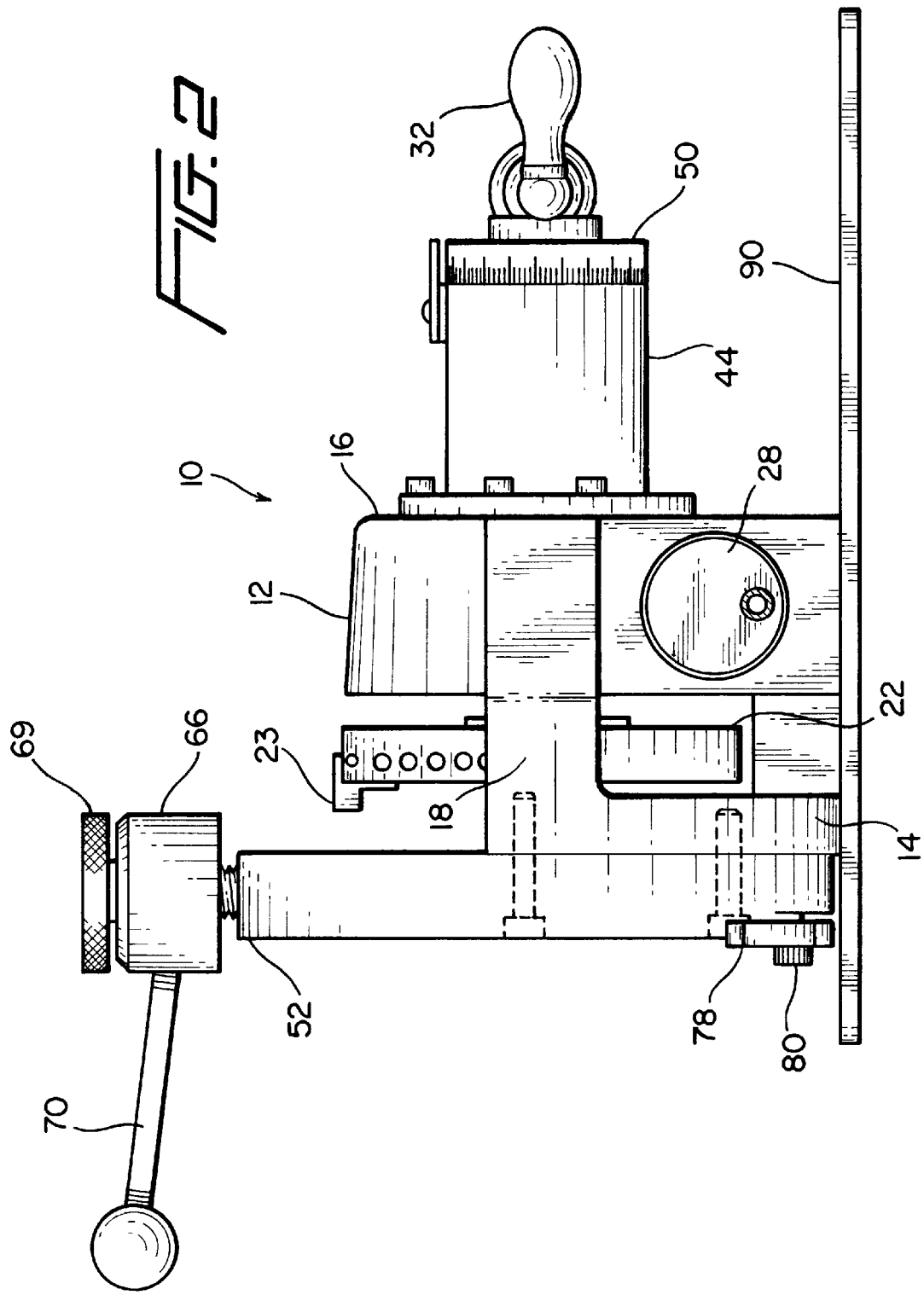
FIG. 2 is a side elevation view thereof.

Advancement of the cutting head 22 towards the forward end area of the housing 12 (to the left, as illustrated in FIGS. 2 and 3) advances cutter bits 23 mounted on the cutting head 22 towards the forward end of the housing 12. The forward end area 14 of the housing is connected to a saddle mounting ring 52 that may be secured to the forward end area 14 of the housing 12 by suitable threaded fasteners.

The saddle mounting ring 52 is generally annular and contains an annulus 54. Mounted within the annulus 54 are a pair of saddle members 56, 58, located at respectively upper and lower positions on either side of the longitudinal axis X—X diametrically opposed from each other within the annulus 54. The outer peripheral contours of the saddle members 56, 58 match the curvature and configuration of the annulus 54 and each saddle member 56, 58 includes an inner circular curved workpiece engaging surface 60, 62 that have identical radii of curvature.

The saddle members 56, 58 are proportioned so as to occupy less than one-half the annulus area 54 so that, when the saddle members 56, 58 are located so as to be contiguous with the annulus 54, a space 64 is provided between the inner opposed edges or ends of the saddle members 56, 58.

The saddle mounting ring 52 includes a forwardly located, radially extending projection 53 having a radially inner lip 53a dimensioned such that it normally prevents axial motion of the saddle members 56, 58 in a forward direction relative to the mounting ring 52 when the saddle members are in their respective operational positions. The forward end area 14 of the housing 12 prevents rearward motion of the lower saddle member 58 relative to the housing 12 because of the location of the lower saddle member between the end area 14 and the projection 53.

Figure 4:
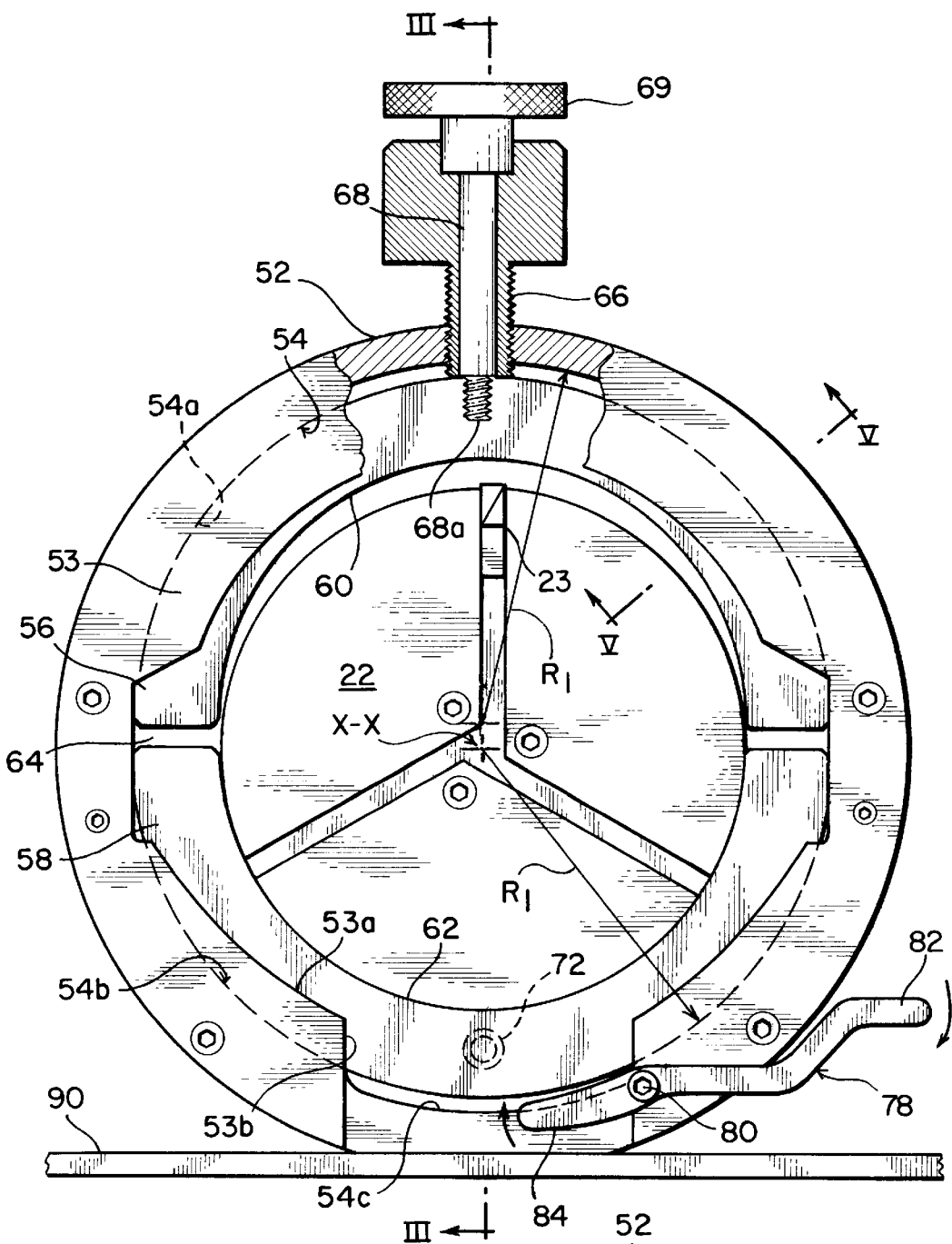
FIG. 4 is a front elevation, partial sectional view thereof.
Figure 5:
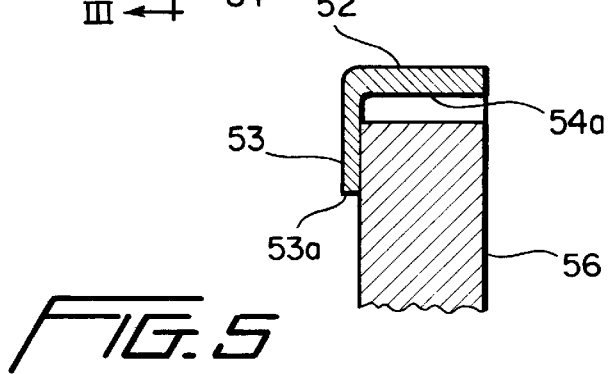
FIG. 5 is a cross section view taken along line V—V in FIG. 4.

The mounting ring 52, as seen in FIG. 4, actually comprises upper and lower annulus surfaces 54a, 54b that are circular shaped about radii $R_1$ centered on two spaced apart centers of curvature, the lower one of which corresponds to the cutting axis X—X. It will thus be seen that the lower saddle member 58 is always located so that it is bottomed on the annulus surface 54b with its inner curved surface 62 centered on axis X—X. The upper saddle member 56 is vertically movable towards and away from axis X—X in a manner to be described below but when it is raised to its uppermost position, it will bottom against annulus surface 54a. Appropriate transition surfaces in the mounting ring 52 span the annulus surfaces 54a, 54b to provide a smooth transition area that does not interfere with the motion of saddle member 56.

A chip or fines escape or removal slot 54c is cut out from the lower portion of the lower annulus surface 54b to permit escape of machine fines (small particles of cut metal or other material separated from workpieces), particularly when the lower saddle member 58 is removed to permit installation of a different size saddle member.

The projection 53 includes a cutout section 53b that permits free flow of chips and fines out of the slot 54c. The cutout 53b also accommodates a portion of the release handle 78, as will be described below.

The upper saddle member 56 is connected to the saddle mounting ring 52 by a threaded coupling 66 that carries an inner threaded pin 68 that is threadedly connected to a threaded bore 68a in the upper saddle member 56.

Rotation of the threaded connector 66, that is threadedly engaged to the saddle mounting ring 52, moves the connector 66, saddle member 56 and pin 68 radially inwardly and outwardly relative to the cutting axis X—X. Pin 68 is restrained against separation from connector 66 by any appropriate means and the connector 66 includes an actuating handle 70 that is provided to enable rotation of the connector 66 relative to the mounting ring 52 by simple manipulation. Normally, the threaded pin 68 removably secures the upper saddle member 56 to the connector 66 so that the entire assembly of saddle member 56, connector 66 and pin 68 move as a unit towards and away from the axis X—X when the connector 66 is rotated to cause advancement of its threads relative to the threads of a cooperating bore in mounting ring 52. The pin 68 includes a manipulating knob 69 that facilitates manipulation of threaded pin 68 to release upper saddle member 56 from the mounting ring 52.

Rotation of handle 70 causes rotation of connector 66 and movement of the upper saddle member 56 in a direction towards axis X—X and also towards the opposed saddle member 58. A tubular workpiece having an end to be cut (not shown) is secured relative to the housing 12 and the cutting head 22 by the inward motion of upper saddle member 56 relative to the mounting ring 52 and relative to the opposing saddle member 58. The inner surfaces 60, 62 of saddle members 56, 58 will be configured to approximately match the outer curvature of a tubular workpiece to be machined and to be clamped between the saddle members 56, 58. Motion of the connector 66 in a radially outward direction, of course, releases a tubular workpiece from between the saddle members 56, 58. Preferably, clamping of a tubular workpiece between the saddle members 56, 58 will result in the tubular workpiece being secured relative to the cutting head 22 so that the workpiece is centered along the cutting axis X—X.

The lower saddle member 58 is retained within the annulus 54 by a friction detent element 72 that, in accordance with the preferred embodiment, is mounted in the forward end of the housing 14 and includes a protrusion 73 at the forward end of a spring-biased detent element 72 that engages a recess, aperture, or other suitable surface profile 74 located on the rearward side of the lower saddle member 58. The protrusion 73 of the detent element 72 is rounded or may even be configured as a ball element in accordance with known spring-biased detent design configurations. The detent element frictionally restrains the lower saddle member 58 from rotation within the annulus 54 about axis X—X and also frictionally restrains it against radial displacement towards and away from the cutting axis X—X.

The saddle members 56, 58 may be interchanged with other saddle members having identical outer peripheral contours matching the inner contours of the annulus 54 but having inner surfaces 60, 62 having different radii of curvature to accommodate different diameter workpieces to be secured to the forward end of the housing 12 in preparation for a tube end squaring or cutting operation.

Removal of both saddle members 56, 58 from annulus 54 is carried out by moving the saddle members radially inwardly and then forwardly out through the inner lip 53a of the projection 53.

For removals, the lower saddle member 58 is first separated from the mounting ring 52 by first dislodging it upwardly from the spring-biased detent mechanism 72 using a lever 78 pivotally connected to the mounting ring by a pivot shaft 80. The lever 78 includes a manipulating portion 82 located on one side of the shaft 80 and a lower saddle member engaging portion 84 located adjacent the lower portion of the outer peripheral surface of the lower saddle member 58 and extending within cutout section 53b of the projection 53a.

It will be apparent from FIG. 4 that manipulation of the handle 78 by moving the manipulating portion 82 in a clockwise direction (preferably against a spring bias) about shaft 80 will result in motion of the saddle member engaging portion 84 in a direction to engage and dislodge the saddle member 58 upwardly from the detent element 72 as shown by the motion arrows in FIG. 4. Specifically, the lower saddle member 58 is raised relative to the lower portion of the annulus 54 to free it from the spring detent element. The lower saddle member 58 may then be lifted up to clear the inner lip of the projection 53 and removed from the mounting ring 52 in a forward direction. The space 64 between the upper and lower saddle members provides room to dislodge the lower saddle member relative to the saddle mounting ring 52 while the upper saddle member 56 is retracted to its full radially outer position.

The upper saddle member 56 may then be disconnected from the threaded connector 66 by rotation of knob 69 to release pin 68 from the upper saddle member 56. The upper saddle member 56 may then be lowered to axis X—X and removed through the lip 53a of projection 53.

Installation of a different set of saddle members 56, 58 may then be implemented in a reverse manner from the procedure just described for the removal of the saddle members. For installation, the upper saddle member 56 may be first installed so that it engages firmly against the annulus 54 and retained at this location by connector 66 and pin 68. The connector 66 and upper saddle member 56 may be manipulated as needed to place the threaded end of the pin 68 in an appropriate location so as to be engaged with the threaded bore 68a in the upper saddle member 56. The upper saddle member 56 may then be withdrawn away from the axis X—X to a location that will accommodate insertion of the lower saddle member 54 in the mounting ring and its friction securement by detent 72. Operation of the replacement saddle members will be the same as previously described.

In operation, a tubular workpiece is advanced to a position between the inner surfaces 60, 62 with the end of the workpiece located adjacent the cutting head 22 but not in engagement with any cutter bits 23 carried by the cutting head 22. The tubular workpiece is then clamped in position centered along axis X—X by advancement of the upper saddle member 56 towards the lower saddle member 58. The cutting head 22 is then advanced towards the end of the tubular workpiece by rotation of the feed handle 32, which advances the feed nut 40, spindle 20 and cutting head 22 with its associated cutter bits 23 towards the end of the tubular workpiece to perform a machining operation thereon that may include squaring, beveling and undercutting or other profiling procedures.

The housing 12 may be mounted on a base 90 by appropriate fasteners to facilitate fixing of the tool 10 relative to a support member (not shown) during its use. The housing 12 and the base 90, of course, would be entirely portable in accordance with the preferred embodiment of the invention.

The feed indicator 50 may be adjustable relative to the feed shaft 34 in a rotational sense by releasing a frictional locking ring 92 threaded to the feed shaft 34 so as to frictionally engage the indicator 50 when the ring 92 is rotated relative to the feed shaft 34. By releasing the locking ring 92 from the indicator 50, the position of the indicator 50 may be adjusted relative to the feed shaft 34 to provide a "zero" setting of the indicator 50 at an appropriate selectable starting point so that the amount of axial feed of the cutting head 22 relative to the housing 12 can be easily established in a variable manner.

It will be understood that various modifications can be carried out to the preferred embodiment by a person skilled in the art without departing from the spirit and scope of the invention as defined in the claims that follow. For example, the spring detent 72 can be reversed so that the spring and friction protrusion are carried by a saddle member and cooperate with the housing Also, the detent mechanism could be carried by the mounting ring to cooperate with the lower saddle member. Also, the relative positions of the saddle members in the annulus 54 can be varied in a circumferential sense.

The drive motor and worm gear set likewise can be varied to provide a different means of transmitting rotary motion to the spindle 20. The motor 28 may be electric or fluid driven and can be located at different positions relative to the housing 12.

The feed housing 44 could be constructed integral with the housing 12 so that it extends rearwardly from the rearward end area 16 of the preferred embodiment. While the use of the forwardly extending arms 18 is preferred so as to leave an unobscured area above and between the arms 18 for viewing a cutting operation on a tubular workpiece, a different support arrangement for the forward end area 14 of the housing 12 could be utilized, including the use of a plurality of arms 18 circumferentially spaced relative to the axis X—X. The threaded connector 66 could be replaced by a different connecting arrangement for manipulating the upper saddle member 56 within the annulus 54. For example, a cam device or other equivalent motion transfer element could be utilized for moving the upper saddle member 56 towards and away from a clamping position. Also, the combination of pin 68 and manipulating knob 69 could be varied to enable manipulation of the pin 68 without the use of tools and to provide a convenient arrangement to disconnect the upper saddle member 56 from the threaded connector 66.

In addition, the specific configuration and location of the lever 78 could be varied and lever could be mounted on the housing instead of the mounting ring. The lever could be substituted by a suitable cam or equivalent device to facilitate manually disengaging the lower saddle member 58 from the mounting ring 52. The radially inward projection 53 and the associated lip thereof 53a could be varied so as to form a continuous or discontinuous radially inwardly extending projection and the specific configuration of the projection could be varied to facilitate ready removal and insertion of saddle members.

Finally, it is to be understood that the saddle members could be located anywhere within the periphery of the mounting ring and that the terms "upper" and "lower" herein have been used as a convenience to describe the preferred embodiment and not in any limiting manner.

We claim:

1. A tube squaring tool comprising:
   a housing having forward and rearward end areas;
   a spindle carrying a cutting head rotatably mounted in the housing for rotation about a longitudinal cutting axis;
   a device for transmitting rotary motion to the spindle and cutting head;
   a feed device arranged to advance the cutting head towards and away from the forward end area of the housing upon actuation thereof;
   a tube clamping device located at the forward end area of the housing;
   said tube clamping device including an annular saddle mounting ring having an inner annulus rigidly connected to the housing and a pair of workpiece engaging saddle members mounted within the mounting ring annulus;
   said saddle members each having an outer peripheral contour matching a contour of the adjacent annulus contour and inner circular contours of preselected identical radii of curvature;
   a first one of said saddle members connected to the mounting ring for selective radial displacement towards and away from the cutting axis;
   a second one of said saddle members being connected to the mounting ring at a location diametrically opposed from the first one of the saddle members;
   a friction detent device cooperating with the second one of the saddle members, the housing and mounting ring such that the second one of the saddle members is frictionally restrained against rotation about the cutting axis and radial displacement in the mounting ring when said second one of the saddle members is disposed in the mounting ring in an operational position;
   a release mechanism arranged, when moved to a saddle release position from an inactive position, to displace the second one of the saddle members relative to the detent device to thereby release the second saddle member from the friction detent device;
   said tube clamping device including a clamping actuator connected between the mounting ring and the first one of the saddle members so as to selectively move said first one of the saddle members toward and away from the cutting axis upon actuation thereof and also to restrain said first one of the saddle members against rotation relative to the mounting ring.

2. A tube squaring tool according to claim 1, wherein said release mechanism is a lever pivotally mounted on the tool adjacent the second one of the saddle members, said lever including an actuating portion on one side of a pivot point and a saddle member engaging portion on an opposite side of said pivot point, said saddle member engaging portion engageable with the second one of the saddle members upon actuation of the actuating portion about the pivot point to release the second saddle member from the detent device.

3. A tube squaring tool according to claim 1, wherein said saddle mounting ring includes at least one radially inwardly extending projection on its forward side; said projection being disposed forwardly of said saddle members and being dimensioned to restrain said saddle members against forward axial motion relative to the mounting ring while permitting said saddle members to be released and separated from the mounting ring by radially inward and axial forward motions of the saddle members relative to the mounting ring.

4. A tube squaring tool according to claim 1, wherein said friction detent device is located on the housing, said friction detent device including a spring-biased detent mechanism biased towards the mounting ring, and said second one of the saddle members includes a detent cooperating surface profile that cooperates with the detent mechanism when the second one of the saddle members is located in the mounting ring in its operational position.

5. A tube squaring tool according to claim 1, wherein the connection between the first one of the saddle members and the mounting ring includes a moveable threaded coupling that is arranged to retain the first one of the saddle members against rotation relative to the mounting ring, to radially displace the first one of the saddle members towards and away from the cutting axis when moved, and to selectively secure and release the first one of the saddle members relative to the saddle mounting ring;

said connection between the first one of the saddle members and the mounting ring further including a threaded pin carried by the threaded coupling, the threaded pin connecting the first one of the saddle members and the threaded coupling together, said threaded pin including an enlarged manipulating knob accessible externally of the threaded coupling.

6. A tube squaring tool according to claim 1, wherein said mounting ring includes a fines removal slot located in a portion of the annulus below the second one of the saddle members.

7. A tube squaring tool according to claim 6, wherein said saddle mounting ring includes at least one radially inwardly extending projection on its forward side; said projection being disposed forwardly of said saddle members and being dimensioned to restrain said saddle members against forward axial motion relative to the mounting ring while permitting said saddle members to be released and separated from the mounting ring by radially inward and axial forward motions of the saddle members relative to the mounting ring, and further including a cutout section in the projection located adjacent said slot.

* * * * *